US008429562B2

(12) United States Patent
Gourdol et al.

(10) Patent No.: US 8,429,562 B2
(45) Date of Patent: Apr. 23, 2013

(54) GRAPHICAL USER INTERFACE FOR COMPUTERS HAVING VARIABLE SIZE ICONS

(75) Inventors: Arnaud Gourdol, Sunnyvale, CA (US); Donald J. Lindsay, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 11/635,689

(22) Filed: Dec. 8, 2006

(65) Prior Publication Data

US 2007/0079255 A1 Apr. 5, 2007

Related U.S. Application Data

(62) Division of application No. 09/478,006, filed on Jan. 5, 2000, now Pat. No. 7,216,304.

(51) Int. Cl.
G06F 3/048 (2006.01)
G06F 15/00 (2006.01)
G06F 3/00 (2006.01)

(52) U.S. Cl.
USPC .............................. 715/837; 715/846; 715/765

(58) Field of Classification Search .................. 715/837, 715/846, 765
See application file for complete search history.

(56) References Cited

U.S. PATENT DOCUMENTS

| 5,060,135 | A | * | 10/1991 | Levine et al. ................ 715/769 |
| 5,303,388 | A | * | 4/1994 | Kreitman et al. ............ 715/836 |
| 5,365,360 | A | * | 11/1994 | Torres ............................ 715/802 |
| 5,479,602 | A | | 12/1995 | Baecker et al. |
| 5,564,004 | A | | 10/1996 | Grossman et al. |
| 5,642,490 | A | | 6/1997 | Morgan et al. |
| 5,684,969 | A | * | 11/1997 | Ishida ............................ 715/800 |
| 5,760,772 | A | | 6/1998 | Austin |
| 5,973,694 | A | | 10/1999 | Steele et al. |
| 6,097,389 | A | | 8/2000 | Morris et al. |
| 6,111,573 | A | | 8/2000 | McComb et al. |
| 6,147,685 | A | | 11/2000 | Bliss et al. |
| 6,169,538 | B1 | | 1/2001 | Nowlan et al. |
| 6,184,886 | B1 | | 2/2001 | Bates et al. |
| 6,237,006 | B1 | | 5/2001 | Weinberg et al. |
| 6,239,795 | B1 | | 5/2001 | Ulrich et al. |
| 6,246,411 | B1 | | 6/2001 | Strauss |
| 6,337,699 | B1 | * | 1/2002 | Nielsen ......................... 715/837 |
| 6,344,864 | B1 | | 2/2002 | Watanabe |
| 6,392,673 | B1 | | 5/2002 | Andrew et al. |
| 6,407,752 | B1 | | 6/2002 | Harnett |

(Continued)

OTHER PUBLICATIONS

Johnson, Tom, http://web.archive.org/web/19990210110545/http://www.vettenet.org/octane.html, Feb. 1999.*

(Continued)

*Primary Examiner* — Jordany Nunez
(74) *Attorney, Agent, or Firm* — Schwegman Lundberg & Woessner, P.A.

(57) ABSTRACT

A computer user interface is provided which allows a user to adjust the size of icons based upon a user's preference or based upon a characteristic of the objects that the icons represent. When the icon sizing is performed according to a user preference, a relative sizing scheme or an arbitrary icon sizing scheme can be employed to variably size icons. Providing the ability to size icons in such a manner allows users to represent a user's categorization of object importance, for example.

22 Claims, 5 Drawing Sheets

U.S. PATENT DOCUMENTS

| | | | |
|---|---|---|---|
| 6,469,722 B1 * | 10/2002 | Kinoe et al. | 715/837 |
| 6,496,206 B1 | 12/2002 | Mernyk et al. | |
| 6,570,582 B1 | 5/2003 | Sciammarella et al. | |
| 6,489,722 B1 | 10/2003 | Kinoe et al. | |
| 6,639,614 B1 * | 10/2003 | Kosslyn et al. | 715/837 |
| 6,724,403 B1 * | 4/2004 | Santoro et al. | 715/765 |
| 7,069,518 B2 * | 6/2006 | Card et al. | 715/776 |
| 7,336,279 B1 * | 2/2008 | Takiguchi | 345/473 |
| 7,346,850 B2 | 3/2008 | Swartz et al. | |
| 2002/0083101 A1 * | 6/2002 | Card et al. | 707/526 |
| 2004/0090470 A1 * | 5/2004 | Kim et al. | 345/846 |
| 2007/0209022 A1 | 9/2007 | Gourdol et al. | |

OTHER PUBLICATIONS

Screen Dumps of Microsoft Windows NT, 1998, pp. 1-7.
Alan Simpson, "Windows 95 Uncut", IDG Books, 1995, pp. 385-402.

* cited by examiner

| OBJECT ID | 0173958 | 6974031 | 1359784 | 2846935 | 4372518 |
|---|---|---|---|---|---|
| CONTAINER | Desktop | Folder1 | Folder1 | Disk2 | Folder10 |
| LOCATION | 128,75 | 12,28 | 42,28 | 6,6 | 14,44 |
| IMAGE | Folder | Document | Document | Folder | Document |
| NAME | Folder1 | Doc1 | Doc2 | Docs | Doc1 |
| SIZING | 0 | 2 | 2 | 1 | 3 |
| VALUE |  | 1 | 2 | 78 | 57 |

GRAPHICAL USER INTERFACE FOR COMPUTERS HAVING VARIABLE SIZE ICONS

This application is a divisional of application Ser. No. 09/478,006 filed Jan. 5, 2000 now U.S. Pat. No. 7,216,304.

BACKGROUND OF THE INVENTION

1. Field of the Invention

The present invention is directed to icons and similar types of graphical objects that are employed in a graphical user interface for computers. More specifically, the present invention is directed to a graphical user interface which displays variable size icons based on various user preferences and/or object characteristics.

2. Description of the Related Art

The rapid advance of computer technology has enabled computer programmers to greatly enhance the sophistication of their software programs. Yet, an increase in sophistication often brings an increase in application complexity. Such complexity often serves to confuse and frustrate computer users as they attempt to learn the operation of a new computer application, especially when the software manuals are large and burdensome to use.

The computer industry has attempted to address the above drawback by designing application programs with user-friendly display interfaces. Generally, the user-friendly paradigm aims to present information in the simplest and most intuitive fashion possible. This may be achieved by organizing information using a series of hierarchical menus or windows. Also, user-friendliness is promoted by including graphical metaphors in the user interface instead of nondescriptive command-line prompts. For example, images of file folders are used to identify containers for storage of information, and graphical depictions of trash containers are employed to assist in the disposal (e.g., deletion) of information.

Conventional graphical user interfaces make extensive use of icons within a computer display system. Graphical icons used on display screens in computer systems can represent physical objects in the system, such as storage media and servers, as well as electronic files that pertain to documents and computer applications selected by a user. The icons present a simple graphical metaphor to users that provide a basic description and/or function of the content of the object represented by the icon. Besides providing access to computer applications and documents, icons can be manually manipulated by a user to perform tasks easily. For example, an icon representing a text document can be selected by a mouse that is manipulated by a user, and be either placed onto another icon representing a word processing application or placed onto an icon of a printer which represents a printing application. Once placed on the printer icon or word processor icon, the document is printed or opened by the word processor, respectively.

Users have been permitted to personalize the graphical user interface, by enabling the user to both create and modify graphical icons for a variety of purposes. For example, facial features such as hair color, skin color and hair style of an icon image representing a human face can be edited. Many different icons can be employed within a computer system to graphically represent the presence of different applications and documents. Many of these icons are only changed slightly with respect to their appearance. An icon image can also change depending upon the status of the document or how the document is currently being employed with the computer system. For example, an object may have one icon image when it is not being used, and another slightly different icon that represents the same object when the object is being accessed or used.

An icon may give the user a basic idea of the functions that are performed by a program represented by the icon or the contents of documents represented by the icon. However, there has been no manner to describe the relative importance of programs or documents represented by icons. While individual labels (i.e., the ability to color icons) can be applied to icons to help classify icons, such categorization still does not provide an intuitive indication of the relative importance of the files or program represented by icons, since the user must remember which color is associated with which category.

To provide some flexibility to the user, the size of all icons in a system can be manually altered. However, currently there are essentially two nominal sizes for icons, typically denoted as small and large. For instance, in the Macintosh Operating System developed by Apple Computer, Inc., a small icon has a 16-by-16 pixel area representation and large icon has a 32-by-32 pixel area representation. A user can alter all icons of a display system from one size to another size based upon his or her preference. For example, if a user wishes to have small icons represented on a display system, he or she can employ a display option to have all icons displayed with 16-by-16 pixel icon sizes. Alternatively, if a user desires, the size of all icons in a display system can be increased to the larger pixel area. A user can change the size of the icons if, for example, hindered eyesight requires larger icons. However, such difference in size does not indicate the relative importance of the files or program represented by the icon, since the change in icon size is performed universally for all icons in a container, such as a folder or window. Accordingly, in order to present a more informative and personalized user interface, a manner of describing to a user relative importance of an icon in relation to other icons in a system is desirable.

SUMMARY OF THE INVENTION

The present invention is directed to a method and associated apparatus for efficiently employing arbitrarily sized icons to represent objects within a display device. To this end, a user's arbitrary sizing of various icons in accordance with the present invention generates icon representations that can advantageously represent categorization of application or file importance, and/or the size of a file represented by an icon.

In accordance with an exemplary embodiment of the present invention, methods and apparatuses for varying the size of a plurality of icons in a window of display system are described which comprise steps and elements for storing icon data representative of a plurality of icon images, receiving a user command to generate icons of varied sizes in the window, and displaying different sized icons within the window.

In accordance with an another exemplary embodiment, methods and apparatuses for varying the size of a plurality of icon images displayed in a display device, based upon a user preference value, comprise steps and elements for storing icon data representative of a plurality of icon images, selecting individual icons to perform icon sizing, designating user preference values for each of the selected icons, generating different sized icons, wherein the different sizes of the icon images are determined based upon the user preference value, and displaying the different sized icon images.

In accordance with yet another exemplary embodiment of the present invention, a method and apparatus for varying a size of a plurality of icons based upon an object characteristic is described, which comprise steps and elements for: storing icon data representative of a plurality of icon images, selecting individual icons to perform icon sizing, determining the object characteristic with respect to each of a plurality of objects associated with the selected individual icons, generating different sized icons representing the objects wherein the size of the icon is determined by the characteristic of the objects, and displaying the different sized icon images representing the plurality of objects.

BRIEF DESCRIPTION OF THE DRAWINGS

Other objects and advantages of the present invention will become more apparent from the following detailed description of the invention when read in conjunction with the accompanying drawings wherein like elements are designated by like numerals and wherein.

DETAILED DESCRIPTION OF THE INVENTION

A portion of the disclosure of this patent document contains material which is subject to copyright protection. The copyright owner has no objection to the facsimile reproduction of the patent document or the patent disclosure, as it appears in the Patent and Trademark Office Patent file or records, but otherwise reserves all copyright rights whatsoever.

The present invention will now be described with reference to the accompanying drawings in which graphical icon representations are generated in various sizes. However, this invention is not limited to only the embodiments set forth within this disclosure. Rather, the generation of variable sized graphical icon representations as shown in this disclosure is meant to be exemplary of many other graphical elements whose size can be varied, in any manner, for the purpose of providing information to the user about the objects represented by such elements.

Figure 1A:
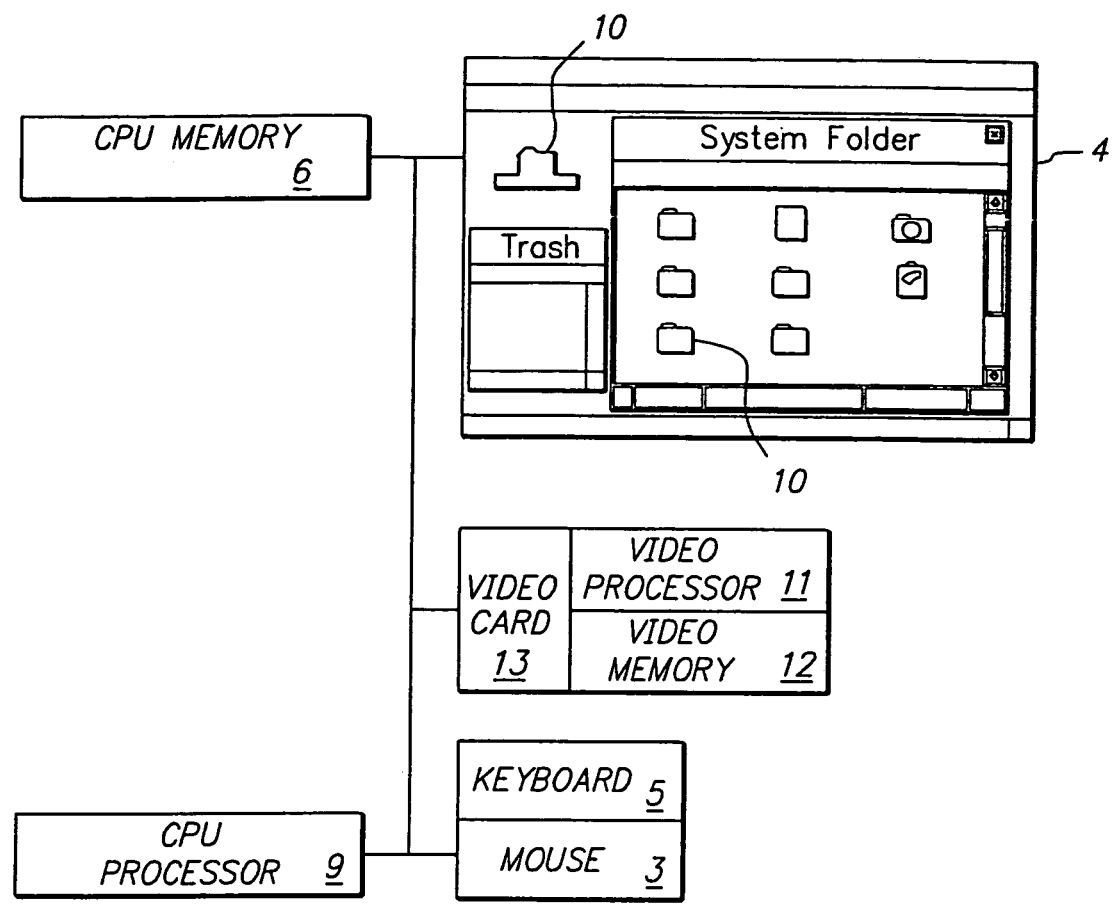
FIG. 1A illustrates a block diagram of hardware components of a computer system of a type in which exemplary embodiments of the present invention can be implemented.

Referring to FIG. 1A, hardware components of a general computer system, in which the present invention can be implemented, are illustrated. The computer system comprises a display device 4 and various input devices such as a keyboard 5 and mouse 3 in operable connection with a CPU memory 6 and CPU processor 9. Additionally, the system can also include a video card 13 used in the processing of video data displayed on display device 4. The video card 13 can also include video processor 11 and a video memory 12. While other elements and components are normally attached to the computer system only these elements are shown so as not to obscure the invention.

Figure 1B:
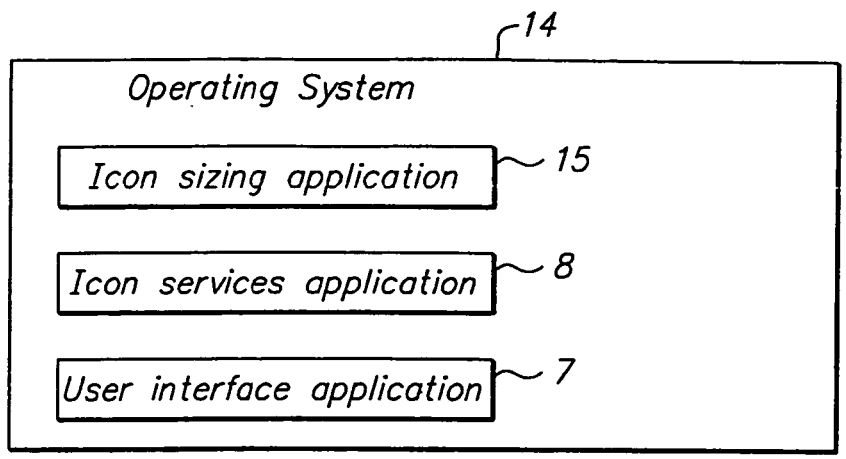
FIG. 1B illustrates a block diagram of an operating system implemented in a computer system of a type in which exemplary embodiments of the present invention can be implemented.

The computer system typically runs in accordance with an operating system, and can execute many different applications and other programs such as word processing programs, accounting programs, and e-mail programs, to name a few. As illustrated in FIG. 1B, three specific portions of operating system 14 running on the system illustrated in FIG. 1A are the user interface application 7, icon services application 8 and icon sizing application 15. As with the other software programs, these applications are typically stored in a computer-readable medium, such as a magnetic disk, and loaded into either the CPU memory 6 or video memory 12 of the video card 13 of the computer system for execution.

The user interface application 7 functions to display graphical elements on the display device 4 which can represent computer system objects that can be manipulated by the user, and launches other programs at the request of the user. Referring again to FIG. 1A, one type of component of the graphical user interface is an icon 10 which can represent an object such as a disk, documents or a computer application. A user is able, through the manipulation of a mouse 3, to access a program by clicking on the icon which is displayed on the computer display that represents the program. Alternatively, a keyboard can also be used to gain access to the object represented by an icon.

Icon services 8 is an application that maintains and retrieves icon image data from the video memory or CPU memory 6 and prepares the data for presentation on display device 4. The data can be rendered using either the CPU memory 6 or the video memory 12. However, the placement of the icon data in the video memory and subsequent rendering is performed faster than using CPU memory 6 and CPU processor 9 due to the many other tasks being performed by the CPU processor 9. Icon sizing application 15 functions to receive a user's input indicating how icons are to be sized, and determines the various sizes of selected icons. The icon services application 8 is able to use this information to size the selected icons.

Figure 2:
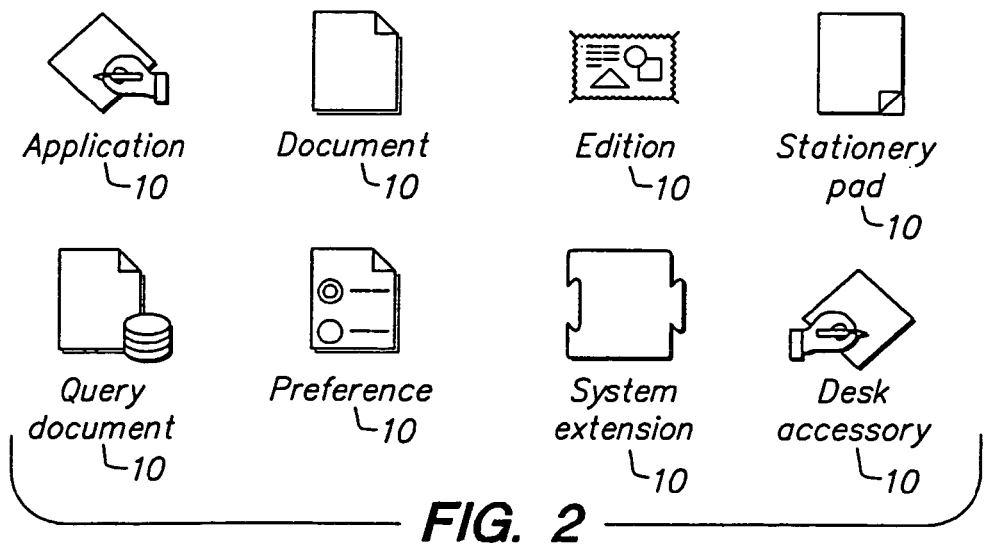
FIG. 2 illustrates exemplary icon images which might be utilized in embodiments of the present invention.

FIG. 2 illustrates exemplary icon images 10 that might be used in display devices of computer systems. Icons 10 are shown which represent various objects such as an application program, a document, an edition, a stationary pad, a query document, a preference item, an operating system extension and a desk accessory program. Typically, the icons are displayed within a window or other type of container object which associates related computer system objects to one another. For instance, icons that represent storage media might be displayed on the desktop. To view the objects stored on a given item of media, such as a hard disk, the user can access the icon associated with that item to open a window, in which icons are displayed that represent the various folders, programs and documents stored on that disk.

In accordance with the present invention, the sizes of various icons, representing objects within particular windows, can be varied relative to one another, to convey information about the objects represented by the icons as well as other informative purposes. Referring to an exemplary embodiment illustrated in FIG. 3, window 30 has an upper pane that contains a plurality of icons 31 which can be displayed on display device 4. Each icon 31, representing at least one object, is displayed using a single standard sized icon (e.g., 16-by-16 or 32-by-32). The icon entitled "Docs", highlighted in window 30, contains a plurality of objects that are represented by plurality of icons 32-36, displayed in a lower pane 38 of the window. The icons in either of the panes of the window 30 can be variably sized in accordance with the present invention.

Figures 3, 5:
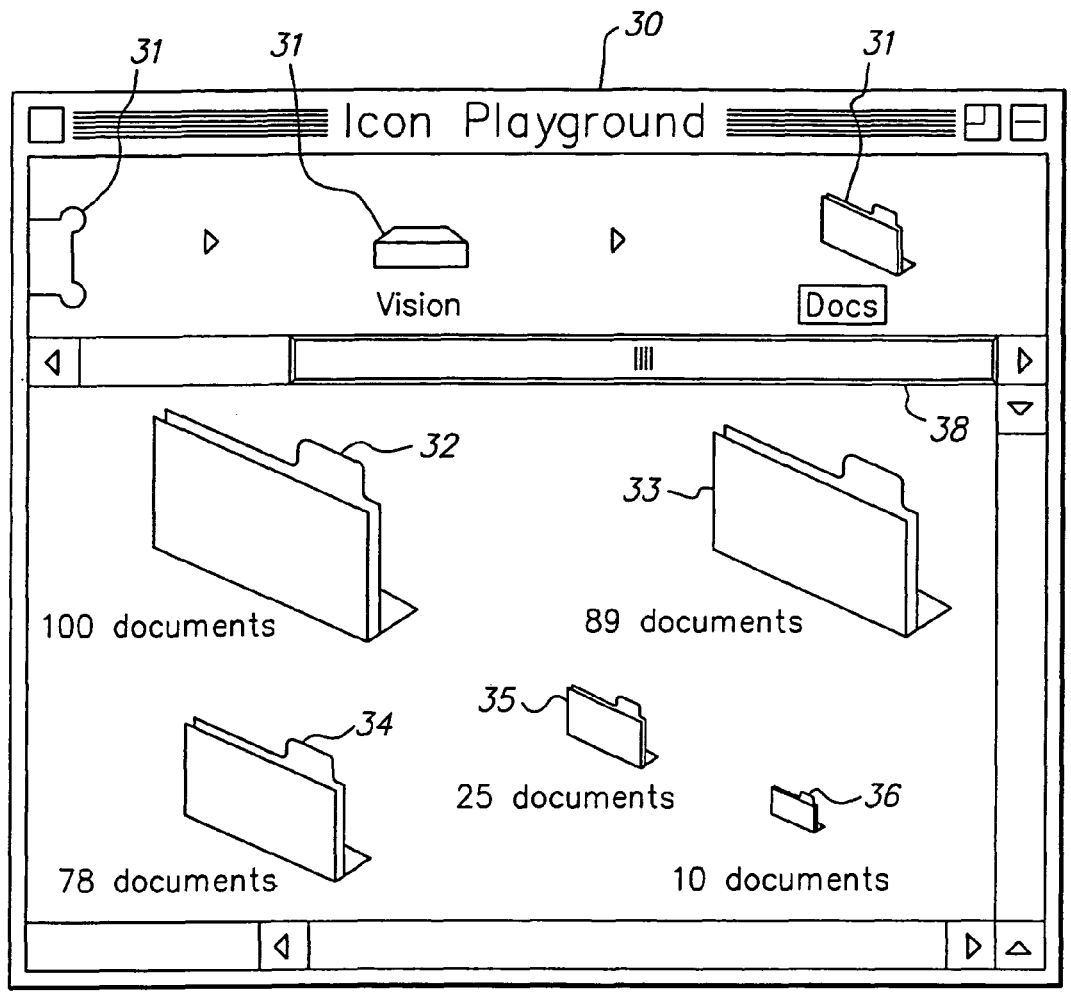
FIG. 3 illustrates a plurality of icons which are sized based upon their relative importance in accordance with an exemplary embodiment of the present invention.
FIG. 5 illustrates one example of a data structure which stores icon data.

For example, as illustrated in the lower pane 38 of FIG. 3, icons located within a specific window can be variably sized based on a characteristic of the objects represented by the icons. Icons 31 located in other panes of the window or in other windows maintain their default size. Alternatively, if a user chooses, the icons 31 located in the upper pane of window 30 can be separately varied in size, according to a user's preference or object characteristics, whether or not the icons in lower pane 38 are varied in size. Many different object characteristics such as the number of files contained within the objects, the object that has been added or amended most recently or the amount of memory utilized by the objects can be used to determine the size of icons within a window.

As discussed above, the FIG. 3 embodiment shows a window pane 38 containing a plurality of icons 32-36. These icons represent folders defining separate logical areas of memory that contain various documents. In accordance with an exemplary embodiment of the present invention, the number of files located in each object constitutes an object characteristic that can be used to determine the relative sizes of the icons. Hence, by simply comparing the relative sizes of the folder icons, the user can readily determine which folder contains the most documents, and which contains the fewest. When a user wishes to size a plurality of icons based upon an object characteristic, he or she can indicate which folders are to be included in the icon sizing application 15 and the specific object characteristic to be used by the icon sizing application 15, by use of keyboard 5, a mouse 3 or other data input mechanism. As described above, other object characteristics can be utilized to determine the size of an associated icon.

Figure 4:
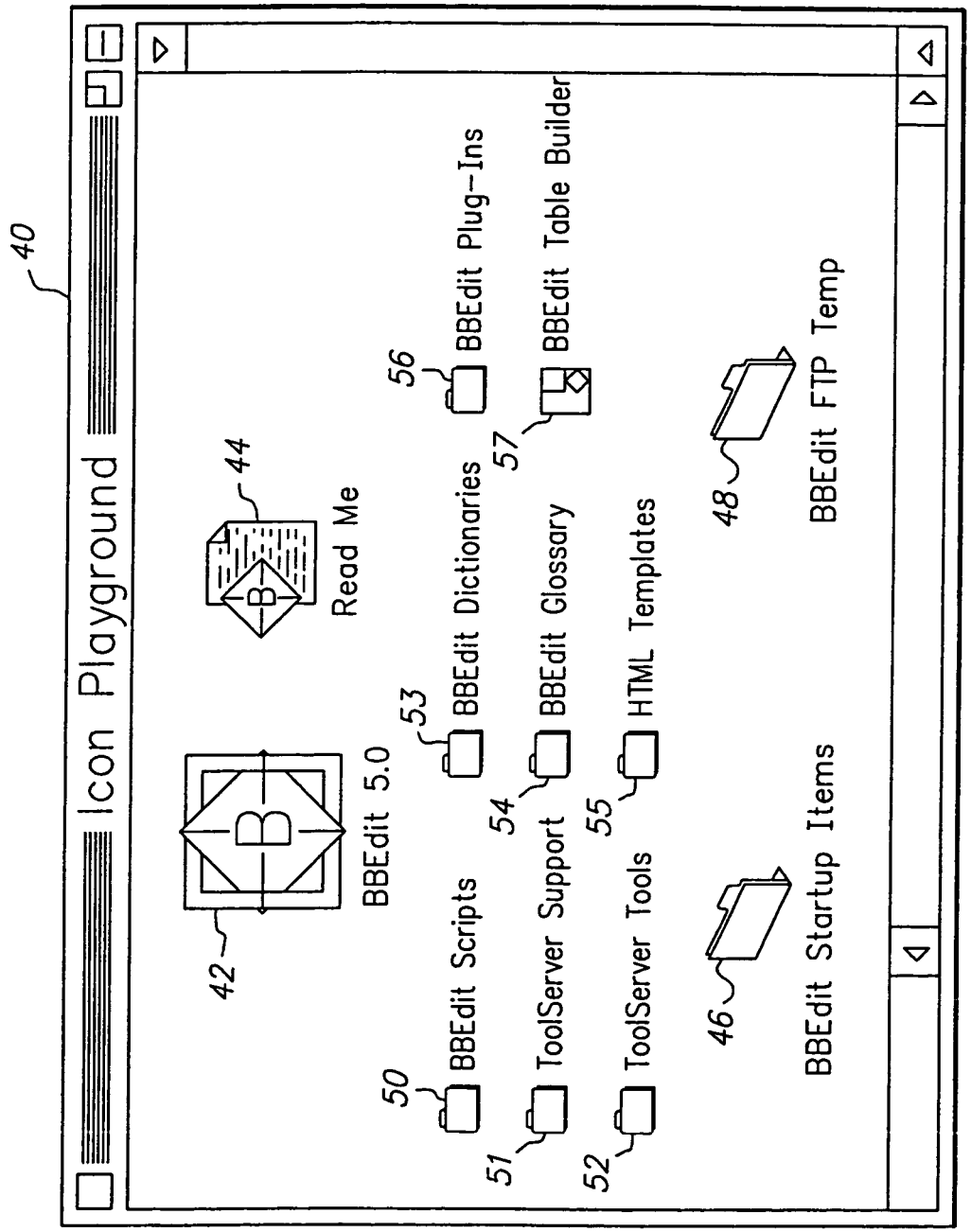
FIG. 4 illustrates a plurality of icons which are variably sized based upon the number of documents within the folder in accordance with an exemplary embodiment of the present invention.

FIG. 4 presents a plurality of variably sized icons illustrative of another exemplary embodiment of the present invention. The icons, each representing various objects, are located within a window 40. In this embodiment of the invention, no object characteristic is employed to determine an icon's size. Instead, the user can arbitrarily size each icon or icon grouping individually according to the user's desires. Specifically, a user can select an icon or a group and indicate or input the size of the icon or grouping of icons.

Alternatively, a user can indicate through the application of a user preference value which icon(s) he/she desires to be the largest, next largest and so forth. For instance in FIG. 4, icon 42 labeled "BBEdit 5.0" has been chosen to be the largest icon in the group. Next the user can indicate that he/she desires icon 44 labeled "Read Me" to be the second largest icon within the window 40.

Additionally, a user can designate one user preference value for a plurality of grouped icons to be sized accordingly. Specifically, icons 46 and 48 labeled "BBEdit Startup Items" and "BBEdit FTP Temp", respectively, illustrate multiple icons that are grouped and sized equally. This is also shown for the smallest icons 50-57 illustrated in FIG. 4. Once the user has chosen the relative size of each of the icons that are to be sized, the icon sizing application 15 calculates the relative size of each icon to be displayed on display device 4.

Every object that is stored within the computer system has associated data that determines the manner in which it is graphically represented by the user interface. FIG. 5 illustrates one example of a data structure that can be used to store this information. Each object has a unique identifier 60, such as a numerical value, and is associated with a container 62 in which it is logically stored. For instance, the container could be the desktop of the user interface, a storage medium in the computer system, or a folder stored within that medium.

When a container or folder is opened, a window is displayed, and the icons associated with that container are displayed in the window at respective location 64. An icon's location may be indicated by a pair of x and y coordinates that indicate the location of the center or upper left corner of the icon, relative to a reference point on the window, e.g. its upper left corner. The icon is displayed as a designated image 66, and with label or name 68, which might be chosen by the user.

In accordance with the invention, the data that is stored for an icon also includes sizing information. A first field 70 indicates whether the icon is to have sizing applied to it, and if so how the sizing is determined. For instance, a value of zero in this field might indicate that the default value for the computer system, or the container's window, is to be employed. A value of one could indicate that variable sizing is carried out in accordance with an object characteristic, and a higher value might indicate that a user-designated value is to be employed for variable sizing. For instance, a value of 2 can indicate that the user value designates relative sizes for the icons, whereas, a value of 3 might indicate that the user has designated the absolute size to be utilized.

If any of the variable sizing options are chosen, the value in a second field 72 indicates the size for the icon. If the option for a user designated size is selected, the value in the second field 72 is determined by the user. For instance, in the example of FIG. 5, the document objects represented in the second and third data columns, which are both located-in "Folder 1", have a sizing value of "2", which means that their icons are displayed according to user-designated relative sizes. The relative size value of the object in the second column, named "Doc1", is 1 which indicates that it's icon will be displayed with the largest size. Since "Doc2" has a relative sizing value of "2", it will be displayed at the next largest size.

In contrast, the object represented in the last column of the exemplary table, "Doc1" in "Folder 10", has a sizing value of 3, which means that it is displayed at a user-designated absolute size. In this case, the user has specified a value of 57, so that the icon image is scaled to a size of 57×57 pixels.

If the sizing is to be carried out in accordance with an object characteristic, the field 72 can contain a value which identifies the type of characteristic that is to be used, e.g. number of items, modification date, etc. Alternatively, it can contain the actual value for the characteristic, as shown for the example in the fourth data column of FIG. 5. For instance, if the chosen characteristic is number of objects in a container, that number can be reflected in the "Value" field 72, e.g. 78 files.

Figure 6:
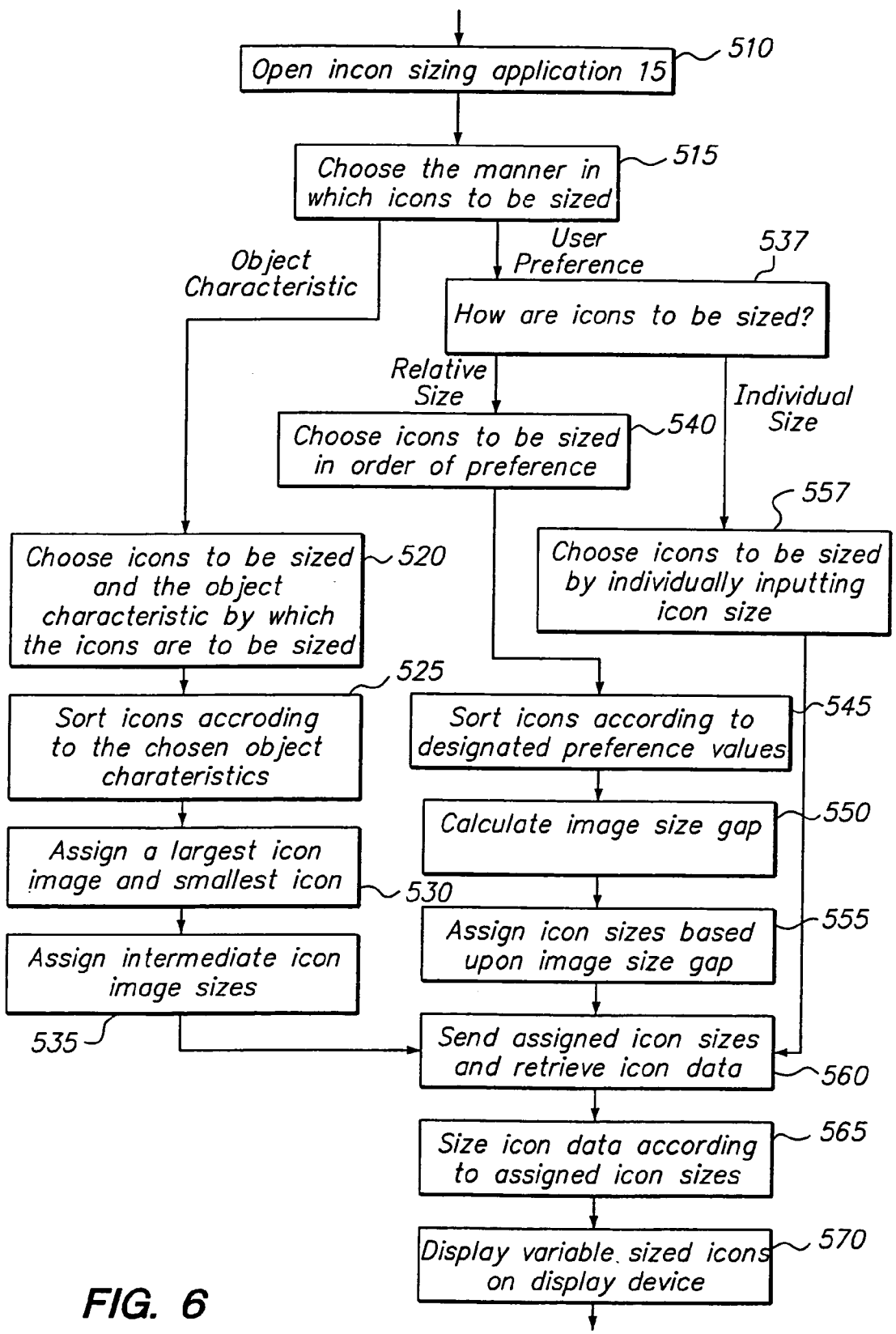
FIG. 6 illustrates an icon sizing routine in accordance with an exemplary embodiment of the present invention.

As illustrated in FIG. 6, the icon sizing application 15 can be invoked when a user desires to vary the relative size of icons displayed on the display device 4. In step 510, when a user wishes to change the size of icons, the icon sizing application is opened, for instance by means of an operating system level command or a control panel. Once the application is opened, in step 515, a user is able to choose the manner in which icons are able to be sized.

If a user desires to have icons sized based upon an object characteristic (discussed with respect to FIG. 3), in step 520, the sizing application requests the user to indicate the icons to be sized, within a window, and the object characteristic to be used in the sizing of the icons. The icon sizing application 15 searches the objects associated with the selected icons and determines a value for the required object characteristic. This value can be stored in the data field 72. In step 525, the processor performs a sort function to order respective icon images of associated objects based upon the object characteristic. In step 530, the icons representing the objects having the two extreme values for the object characteristic are assigned a maximum icon size (e.g., 128-by-128 pixel area) and minimum size (e.g., 16-by-16 pixel area), respectively.

In step 535, the remaining intermediate icon images are sized in direct proportion to the minimum and maximum preferences determined by the sorting routine. For example, referring to FIG. 3, if the maximum sized folder (128-by-128 pixel area) has 100 documents and the minimum sized folder (16-by-16 pixel area) has 10 documents, then a folder containing 55 documents would have a size of 72-by-72 pixel area.

In another facet of the present invention, if an object characteristic changes (e.g., the number of documents increases or decreases), the icon image representing the object in the display device 4 can be dynamically revised to represent the changed characteristic of the object. It should be noted that the specific maximum and minimum sizes of icon images are merely exemplary. The maximum and minimum size for icons can also be chosen via user input in addition to system requirements/limitations.

On the other hand, in step 515, the user can choose to designate icon sizes. In this case, at step 537, the user can choose further either the relative size of icons or can arbitrarily size icons. In step 540, if a user desires to choose the relative size of each icon within a window as a preference item (discussed with respect to FIG. 4), the sizing application requires the individual to choose an order of icons and their relative sizes. For example, a user can sequentially choose icons by selecting the icons (either via keyboard or mouse) in a desired order. The icon sizing application will then save the sequential order in which the icons were selected in the field 72 and next determine the relative sizes of each icon, dependent upon the size of the maximum and minimum icons and the number of icons to be sized. Alternatively, the user can manually choose an icon and manually input a number indicating the relative ranking of the icons.

In step 545, the processor sorts icon images according to the given user preference value and assigns the maximum icon size (MAX) and minimum icon size (MIN) allowable to the icon images with the highest user preference value and lowest user preference value, respectively. In step 550, once the maximum and minimum sizes are ascertained, an image size gap is calculated to provide an equal size gap between icon image sizes, as follows:

$$\text{Image Size Gap} = (MAX - MIN)/(N-1),$$

where N is equal to the number of variable sizes chosen by the user.

As an example, using the four size differences discussed with respect to FIG. 4 and a maximum and minimum icon image size of 16-by-16 and 128-by-128, respectively an icon image size gap of 37.33 pixels is calculated. Since an icon size employing fractional pixels is not practical, the size of the icon is rounded, either up or down, to the nearest whole pixel value (i.e., in this case, either 37 or 38). In step 580, once the proper size gap between the icons is calculated, the icons are assigned a corresponding size and displayed.

Referring back to step 537, the user can decide not to choose a relative size of icons, but rather individually choose the absolute size of specific icons. In step 557, the individual can select an icon or a group of icons and specifically input an icon size for the icon(s).

In step 560, once the variable icon sizes have been determined, the icon data associated with the icons is retrieved from the video memory 12 or CPU memory 6 by the icon services application 8. The icon image data can be stored in memory in several different ways. For example, instead of storing data for only a 16-by-16 icon image representation, data for multiple icon representations (e.g., 16-by-16, 64-by-64 and 128-by-128) icon images can be stored. The video processor 11 or CPU processor 9 can then retrieve icon data from memory having the size that is the closest to the icon data to be displayed and scale the data accordingly to obtain the icon image size needed. This allows for better image display than merely having one icon image representation for all possible icon image sizes. In step 565, the icon image data, if not the exact size needed for display, is then sized by the CPU to the size to be displayed. Finally, in step 570, the different sized icons are rendered and displayed on the display device 4.

Accordingly, the use of the icon sizing application 15 in accordance with the present invention provides a way for a user to indicate preferences with respect to individual icons or individual groupings of icons. By having display system size icons based either upon a specific user preference and/or user-chosen object characteristic, a more intuitive graphical user interface can be employed in computer systems.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

The invention claimed is:

1. A method for displaying icons that respectively represent file system objects that can contain one or more items, said method comprising the following steps:

providing a plurality of different sizing functions that are selectable by a user, each of the different sizing functions applicable to a plurality of user selected icons, and at least one of which is based on a number of items contained in the file system objects;

receiving a user's designation of a sizing function, from the plurality of different sizing functions;

determining whether the received user's designation indicates a sizing function that is based on the number of items contained in the file system objects;

if the user designated sizing function is based on the number of items contained in the file system objects, determining, by a processor, the number of items that are respectively contained in a plurality of said file system objects, each of said plurality of file system objects corresponding to a respective one of a plurality of said user selected icons;

assigning, by the processor, relative display sizes to said plurality of user selected icons, said relative display sizes being assigned based upon the number of items respectively contained in the file system objects, such that the sizes assigned are representative of the number of items respectively contained in the file system objects that the plurality of user selected icons represent; and displaying on a display device said plurality of user selected icons at their respective assigned display sizes.

2. The method of claim 1, wherein said file system objects comprise folders.

3. A method for displaying icons that respectively represent file system objects that contain one or more items, comprising the following steps:

receiving a user selected subset of icons;

providing a plurality of different sizing functions that are selectable by the user, each of the different sizing functions applicable to the user-selected subset icons, and at least one of which is based on a number of items contained in the file system objects;
receiving a user's designation of a sizing function, from the plurality of different sizing functions;
determining whether the received user's designation indicates a sizing func on that is based on the number of items contained in the file system objects;
if the user designated sizing function is based on the number of items contained in the file system objects, determining, by a processor, the number of items that are respectively contained in each of the file system objects respectively represented by the user selected subset icons;
assigning, by the processor, relative display sizes to said user selected subset of icons, said relative display sizes being assigned based upon the number of items respectively contained in the file system objects corresponding to the user selected subset of icons, such that the sizes assigned are representative of the number of items respectively contained in the file system objects that the user selected subset of icons represent;
displaying on a display device the user selected subset of icons at their respective assigned display sizes; and
displaying on the display device icons that are not included in the user selected subset of icons at a default display size.

4. The method of claim 3, wherein said file system objects comprise folders.

5. A computer-readable storage device containing a program that causes a computer to perform the following operations:
providing a plurality of different sizing functions that are selectable by a user, each of the different sizing functions applicable to a plurality of user selected icons, and at least one of which is based on a number of items contained in the file system objects;
receiving a user's designation of a sizing function, from the plurality of different sizing functions;
determining whether the received user's designation indicates a sizing function that is based on the number of items contained in the file system objects;
if the user designated sizing function is based on the number of items contained in the file system objects, determining the number of items that are respectively contained in file system objects that can contain one or more items, each of said file system objects corresponding to a respective one of a plurality of user selected icons;
assigning relative display sizes to said plurality of user selected icons, said relative display sizes being assigned based upon the number of items respectively contained in said file system objects, such that the sizes assigned are representative of the number of items respectively contained in the file system objects that the plurality of user selected icons represent; and
displaying on a display device said plurality of user selected icons at their respective assigned display sizes.

6. The computer-readable storage device of claim 5, wherein said file system objects comprise folders.

7. A computer-readable storage device containing a program that causes a computer to perform the following operations:
receiving a user selected subset of icons;
providing a plurality of different sizing functions that are selectable by the user, each of the different sizing functions applicable to the user-selected subset of icons, and at least one of which is based on a number of items contained in the file system objects;
receiving a user's designation of a sizing function, from the plurality of different sizing functions;
determining whether the received user's designation indicates a sizing function that is based on the number of items contained in the file system objects;
if the user-designated sizing function is based on the number of items contained in the file system objects,
determining the number of items that are respectively contained in each of the file system objects respectively represented by the user selected subset of icons;
assigning relative display sizes to said user selected subset of icons, said relative display sizes being assigned based upon the number of items respectively contained in the file system objects corresponding to the user selected subset of icons, such that the sizes assigned for an icon are representative of the number of items respectively contained in the file system objects the user selected icons represent;
displaying on a display device the user selected subset of icons at their respective assigned display sizes; and
displaying on the display device icons that are not included in the selected subset at a default display size.

8. The computer-readable storage device of claim 7, wherein said file system objects comprise folders.

9. A computer system, comprising:
a display device; and
a graphical user interface that displays, on said display device, icons representative of file system objects that can contain one or more items, and that operates to
provide a plurality of different sizing functions that are selectable by a user,
each of the different sizing functions applicable to the icons, and at least one of which is based on a number of items contained in the file system objects;
receive a user's designation of a sizing function, from the plurality of different sizing functions;
determine whether the received user's designation indicates a sizing function that is based on the number of items contained in the file system objects;
if the user designated sizing function is based on the number of items contained in the file system objects,
determine the number of items that are respectively contained in a plurality of said file system objects, each of the plurality of file system object corresponding to a respective one of an identified-plurality of icons,
assign relative display sizes to said identified plurality of icons, said relative display sizes being assigned based upon the number of items respectively contained in said file system objects, and
display on the display device said identified plurality of icons at their respective assigned display sizes.

10. The computer system of claim 9, wherein said graphical user interface is responsive to the selection of a subset of said icons to display the selected icons at their assigned display sizes, and to display non-selected icons at a default size.

11. The method of claim 1, wherein the plurality of user selected icons are a subset of the displayed icons.

12. The method of claim 11, wherein the subset of the displayed icons consists of icons within a window.

13. The method of claim 1, wherein the plurality of user selected icons are identified by a selection received from a user-input device.

14. The method of claim 1, wherein the plurality of user selected icons are identified by the processor based on respective characteristics of the file system objects.

15. The method of claim 1, wherein the plurality of user selected icons are identified by the processor based on respective attributes of the icons.

16. The method of claim 1, wherein the sizes assigned to the plurality of user selected icons increases in proportion to the respective number of items contained in the corresponding file system objects.

17. The computer system of claim 9, wherein the identified plurality of icons are a subset of the icons.

18. The computer system of claim 17, wherein the subset of icons consists of icons within a window.

19. The computer system of claim 9, wherein the plurality of icons are identified by a selection received from a user-input device.

20. The computer system of claim 9, wherein the plurality of icons are identified by the processor based on respective characteristics of the file system objects.

21. The computer system of claim 9, wherein the plurality of icons are identified by the processor based on respective attributes of the icons.

22. The computer system of claim 9, wherein the sizes assigned to the identified plurality of icons increases in proportion to the respective number of items contained in the corresponding file system objects.

* * * * *

UNITED STATES PATENT AND TRADEMARK OFFICE
CERTIFICATE OF CORRECTION

PATENT NO. : 8,429,562 B2
APPLICATION NO. : 11/635689
DATED : April 23, 2013
INVENTOR(S) : Gourdol et al.

It is certified that error appears in the above-identified patent and that said Letters Patent is hereby corrected as shown below:

In the Claims

In column 8, line 67, in Claim 3, after "subset", insert --of--, therefor

In column 9, line 6, in Claim 3, delete "func on" and insert --function--, therefor In column 9, line 12, in Claim 3, after "subset", insert --of--, therefor Signed and Sealed this
First Day of October, 2013

Teresa Stanek Rea
*Deputy Director of the United States Patent and Trademark Office*